United States Patent [19]

Yoneda et al.

[11] Patent Number: 4,956,326

[45] Date of Patent: Sep. 11, 1990

[54] METHOD FOR DEHALOGENATION OF A HALIDE AND CATALYST USED THEREFOR

[75] Inventors: Noriyuki Yoneda; Toshiji Makabe; Jun Kaita; Munekazu Nakamura; Yoshiko Endoh; Hidehiko Kudoh; Shunji Higashi, all of Kanagawa, Japan

[73] Assignees: Chiyoda Chemical Engineering & Construction Co., Ltd., Kanagawa; Nippon Kokan Co., Ltd., Tokyo, both of Japan

[21] Appl. No.: 71,964

[22] Filed: Jul. 10, 1987

[30] Foreign Application Priority Data

Jul. 10, 1986 [JP] Japan ................... 61-160891
Jul. 10, 1986 [JP] Japan ................... 61-160892
Oct. 2, 1986 [JP] Japan ................... 61-233297

[51] Int. Cl.$^5$ ........................... B01J 27/224
[52] U.S. Cl. ................... 502/1.78; 502/185; 502/207; 502/261; 502/262; 502/325; 502/439
[58] Field of Search ............ 502/1, 261, 262, 178, 502/200, 207, 185, 325, 439

[56] References Cited

U.S. PATENT DOCUMENTS

| | | | |
|---|---|---|---|
| 3,881,944 | 5/1975 | Beall et al. | 502/439 X |
| 4,080,284 | 3/1978 | Mitchell | 502/232 X |
| 4,163,736 | 8/1979 | Acres et al. | 502/252 X |
| 4,507,401 | 3/1985 | DuBois et al. | 502/232 X |
| 4,562,174 | 12/1985 | Stiles | 502/174 |
| 4,612,099 | 9/1986 | Tanno et al. | 502/262 X |
| 4,654,458 | 3/1987 | Jezl et al. | 585/415 X |

FOREIGN PATENT DOCUMENTS

| | | | |
|---|---|---|---|
| 682150 | 3/1964 | Canada | 502/261 |
| 730676 | 3/1966 | Canada | 502/262 |
| 1505615 | 12/1967 | France | 502/262 |
| 1086943 | 10/1984 | Japan | 502/262 |
| 265938 | 4/1928 | United Kingdom | 502/262 |
| 2163364 | 8/1985 | United Kingdom | 502/262 |

OTHER PUBLICATIONS

Hawley, G., *The Condensed Chemical Dictionary*, 9th ed., Van Nostrand Rheinhold Company, New York, ®1977, p. 540.

*Primary Examiner*—Patrick P. Garvin
*Assistant Examiner*—George R. Fourson
*Attorney, Agent, or Firm*—Sughrue, Mion, Zinn, Macpeak & Seas

[57] ABSTRACT

A catalyst for dehalogenation of a halide comprising a corrosion-resistant ceramic or graphite having a surface area of 5.0 m$^2$/g or less and, supported thereon, at least one of a platinum group metal and a silicide thereof, and a method of dehalogenation of a halide using this catalyst.

10 Claims, No Drawings

METHOD FOR DEHALOGENATION OF A HALIDE AND CATALYST USED THEREFOR

BACKGROUND OF THE INVENTION

The present invention relates to a catalyst for dehalogenation of a halide and a method for dehalogenating a halide using this catalyst. More particularly, the present invention relates to a catalyst for dehalogenation of a halide such as a chloride, iodide, or bromide of silicon, titanium, zirconium, hafnium, niobium, tantalum, molybdenum, tungsten, tellurium, cadmium, etc., as well as a method for dehalogenation of such halides using this catalyst.

In the electronics industry, there is a great demand for ultrapure forms of the elements mentioned above which are generally referred to as "new metals": high-purity silicon is used in large quantities as substrates for LSI; high-purity niobium is used as a superconducting material; and high-purity molybdenum, tungsten, etc., are used as metal or metal silicide targets in the manufacture of LSIs. The use of these "new metals" is anticipated to expand further in the years to come.

Commercial production of these new metals in high purity starts with a crude material of low purity which is halogenated and distilled to attain a product of higher purity, which is then subjected to thermal decomposition or hydro-decomposition to produce a product having the desired ultrahigh purity. A halide of higher halogenation degree is not easy to decompose and causes such disadvantages as low yield and low rate of reaction and the need to employ high reaction temperatures. It is therefore advantageous to use a halide of lower halogenation degree as the starting material In addition, if the halide of lower halogenation degree generates a halide of higher halogenation degree as a by-product of decomposition reaction, it is advantageous to re-convert this by-product into a halide of lower halogenation degree for further use as the starting material.

It is advantageous for the purposes of increasing the rate and yield of reaction and of allowing the reaction to proceed under mild conditions that trichlorosilane rather than tetrachlorosilane in the production of high-purity silicon, and niobium tetrachloride rather than niobium pentachloride is hydrodecomposed in the production of high-purity niobium. Furthermore, the halides to be handled are corrosive and it is of extreme importance to reduce their corrosive nature by employing lower reaction temperatures.

Therefore, halides of higher halogenation degree are converted to those of lower halogenation degree before they are subjected to subsequent steps and the reactions employed for this purpose are collectively referred to as "dehalogenating reactions".

One prior technique of dehalogenation of halides involves dehalogenating tetrachlorosilane into trichlorosilane by hydrogenation conducted in the presence of hydrogen using copper or copper chloride as a catalyst (see, for example, Japanese patent application (OPI) Nos. 16915/83, 73617/81 and 45919/84}(the term "OPI" used herein means a published unexamined Japanese patent application). A method is also known that performs the same reaction using a catalyst containing a metal of the platinum group (Japanese Pat. Publication No. 10532/80).

However, in the former method, copper chloride forms during reaction if copper is used as a catalyst (to say nothing of the case where copper chloride is used as a catalyst), and the copper chloride, which is volatile under the reaction conditions employed, enters trichlorosilane to lower the purity of the product and cause excessive consumption of the catalyst. Hence, the copper or copper chloride catalyst is not suitable for prolonged service.

According to Japanese Pat. Publication No. 10532/80, a platinum group metal used as a catalyst component is supported on activated carbon, alumina, or silica, and it can safely be assumed that the carriers actually used in this reference method are porous activated carbon, γ-alumina, and common porous silica gel, respectively. In the catalyst under consideration, the platinum group metal is not consumed as fast as copper, but on the other hand, the carrier is consumed to cause a rapid decrease in the catalytic activity. Therefore, this catalyst is also unsuitable for prolonged service.

It is very important for successful industrial manufacturing operations that products of consistent quality are continuously produced for a prolonged period of time. In view of this aspect, the catalysts of the prior arts are not suitable for industrial use.

SUMMARY OF THE INVENTION

The present inventors have paid attention to the superiority of the method for producing trichlorosilane with a platinum group metal used as a catalyst, and in view of the commercialization of this catalyst, have made various investigations of research and development of a durable catalyst for prolonged use and optimum conditions for the reaction performed in the presence of this catalyst. As a result, the present inventors have found that the catalyst according to the present invention has significantly improved performance such as prolonged service life, for use as a catalyst for dehalogenation of a halide. The present inventors have also found optimum conditions for the reaction that is to be performed in the presence of this catalyst.

The present invention, therefore, relates to a catalyst for dehalogenation of a halide comprising a corrosion-resistant ceramic or graphite having a surface area of 5.0 m2/g or less supported thereon at least one of a platinum group metal and a silicide thereof, and also relates to a method for dehalogenation of a halide by using this catalyst under the conditions of a reaction temperature of from 200 to 1,100° C. and a molar ratio of hydrogen to a halide (hydrogen/halide) is from 0.5 to 40.

DETAILED DESCRIPTION OF THE INVENTION

The activity of catalysts increases with their surface area and it is common sense in the art to use catalyst carriers having large surface areas. In response to this common sense, catalysts containing platinum group metals are supported on such carriers as porous activated carbon, silica gel and γ-alumina. However, as mentioned above, by using these materials as carriers for the catalyst employed in dehalogenation of a halide, they are consumed during the reaction to cause a significant decrease in the activity of the catalyst. On the other hand, if a catalyst in which the catalytic component is supported on a corrosion-resistant ceramic or graphite carrier is used according to the present invention, the carrier is not consumed during the reaction and allows the catalyst to be usable for a prolonged period.

As the corrosion-resistant ceramic, a nonporous silica, a nitride, and a carbide, are preferably used.

The non-porous silica used as a carrier in the catalyst according to the present invention has non porous structure in its bulk and has a BET surface area of 5.0 $m^2/g$ or less as measured by the $N_2$-based BET method. A specific example of the nonporous silica is a glassy solid fused silica. For supporting much catalytic compound, the following silica carriers are preferred: a glassy solid fused silica that has been etched with hydrofluoric acid to a depth of at least 0.1 $\mu m$; a glassy solid fused silica that has been ground to a depth of at least 0.1 $\mu m$ with an abrasive such as silicon carbide; and a glassy solid fused silica that has been treated by bringing its surface into contact with hot hydrogen and chlorosilane. Another suitable silica carrier can be prepared by crystallizing under elevated temperatures a silica gel having a surface area of from 150 to 300 $m^2/g$, preferably from 180 to 250 $m^2/g$.

Treatment with hydrofluoric acid may be accomplished by etching. Although not being essential, it is preferable to effect etching to a depth of 0.1 $\mu m$ or more. The upper limit of etching may be of any value. For instance, 1 part by weight of a carrier of a glassy solid fused silica may be immersed in 0.5 to 5 parts by weight of an aqueous solution of 50% HF at room temperature for a period of 1 to 10 hours. As a result of this treatment, the silica carrier loses weight by 5 to 36 wt. % and develops irregularities in its surface.

In the treatment of a silica carrier by grinding, it is preferable but not essential to grind the surface to a depth of 0.1 $\mu m$ or more. The upper limit of grinding may be of any value. For instance, an abrasive such as carborundum which is commonly employed in the manufacture of ground glass may be blown against the silica carrier at room temperature, with air being used as a carrier gas. As a result of this treatment, the silica carrier develops fine irregularies in its surface to make it turn white.

If the silica carrier is treated with hot hydrogen and/or chlorosilane, it may be brought into contact with a gaseous mixture of hydrogen and tetrachlorosilane (600 to 800° C.) for at least 100 hours until fine irregularities develop in the surface. In certain cases of hydrogenation of chlorosilanes, the reactor is packed not only with the catalyst but also with a solid fused silica as a heat-transfer medium. When one cycle of such process is completed, the solid fused silica may be recovered from the reactor and can be used as an effective silica carrier because it has undergone the aforementioned surface treatment during the process.

The nitride and carbide employed as the catalyst carrier according to the present invention are classified as what are generally called "new ceramics" and specific examples include nitrides such as silicon nitride and boron nitride, and carbides such as silicon carbide. These materials can be advantageously used as catalyst carriers of the present invention since they exhibit very high resistance to corrosive hot hydrogen and halogen atmospheres. Silicon nitride and other materials mentioned above are difficult to produce and it is particularly difficult to attain porous products which are suitable for supporting catalytic components. Therefore, most of the uses of these materials have been limited to crucibles and structural materials for the manufacture of semiconductor devices and little use has been made as first time the use of these materials in dehalogenation of halides and to the best knowledge of the present inventors, no instance has been known in which they are employed in the type of reaction contemplated by the present invention.

The properties of the nitride, carbide and graphite used as catalyst carriers in the present invention are not limited in any way except for the surface area. For the purpose of supporting catalytic components, these materials have the porosity being preferably in the range of from 3 to 50%, more preferably in the range of from 10 to 40%. Silicon nitride, silicon carbide and boron nitride that are prepared by any of the conventional methods may be used but the sintering method is preferred for the purpose of producing a porous structure. As for graphite, conventional porous graphite is preferably used.

The catalytic component used in the present invention is either a platinum group metal or a silicide thereof or both, which are selected from among platinum, palladium, ruthenium, rhodium, iridium, osmium, and silicides thereof. Because of high catalytic activity and low price, at least one member selected from the group consisting of palladium, ruthenium, and silicides thereof is preferably used, more preferably at least one member selected from the group consisting of palladium and palladium silicide. A preferred palladium silicide is one having a crystalline $Pd_2Si$ structure. The catalytic components mentioned above may be used either independently or in combination, such as palladium combined with ruthenium.

Palladium used as a catalytic component is generally supported in an amount of from about 0.01 to about 10.0 wt. %, preferably from about 0.05 to about 5.0 wt. %, more preferably from about 0.1 to about 2.0 wt. %, based on the total weight of catalyst. If palladium is supported in an amount of less than about 0.01 wt. %, its catalytic activity is not fully exhibited and an unduly long contact time is required. Even if palladium is supported in an amount exceeding about 10.0 wt. %, no corresponding increase in catalytic activity is attained and an increased cost is the simple result. A particularly preferred range of the amount in which palladium is supported is from 0.1 to 2.0 wt. %; in this range, the size of palladium particles and the degree of their dispersion are suitable enough to have their catalytic activity fully exhibited.

If catalytic components other than palladium are used, their supported amount varies somewhat depending upon their specific type, but generally, they may be used in amounts comparable to those in which palladium is used. If two or more catalytic components are used in combination, it suffices that the sum of the individual components satisfies the aforementioned requirements for the amount in which palladium is supported. The combination of catalytic components and the proportions of the amounts in which they are supported may be appropriately selected according to such factors as reaction conditions.

The catalyst of the present invention may be prepared by any known method, but for the purpose of allowing the catalytic component to be supported uniformly on the carrier, the following method is preferably employed: an aqueous solution of a chloride or a nitrate of a platinum group metal or an ammonium complex salt thereof, which are present in a predetermined concentration, is impregnated in a carrier such as nonporous silica or silicon nitride, and after removing the aqueous solution which has not been retained on the surface of the carrier, the catalyst is dried and subsequently reduced. If the catalyst is dried up with excess solution remaining on the surface of the carrier, the catalytic metal is supported unevenly and areas where the metal is weakly bonded to the carrier and may separate during reaction occur.

The amount in which a certain catalytic component is to be supported is determined by the concentration of a metal salt thereof in the aqueous solution, which is appropriately selected according to the desired amount in which the catalytic component supported. Supporting the catalytic component in an amount exceeding about 5 wt. % causes undesired separation of the supported component during reaction. A catalyst in which a silicide of a platinum group metal is supported can be prepared by bringing a platinum group metal supported catalyst into contact with a silicon halide (e.g. silicon tetrachloride) and hydrogen at 400 to 800° C..

The reaction using the catalyst of the present invention may be carried out by a conventional flow method such as a fixed-bed method, with the catalyst shape being appropriately selected. The shape of catalyst particles is not limited to any form but spheres, cylinders, and crushed particles with a size of from 3 to 30 mm are used economically.

Using the catalyst of the present invention, the reaction of dehalogenating halides may be carried out at temperatures of from 200 to 1,100° C., preferably from 550 to 850° C., and at a hydrogen pressure of from 1 to 20 atm for a contact period of from 0.01 to 100 seconds, preferably from 0.1 to 5 seconds. Satisfactory results generally can be attained by a contact period of no more than 1 second. The molar ratio of hydrogen to the halide (hydrogen/halide) is selected to be within the range of from 0.5 to 40, preferably from 2.0 to 10.

The reaction conditions are hereunder described more specifically with reference to the case in which tetrachlorosilane is dechlorinated to produce trichlorosilane. First, the reaction temperature is preferably within the range of from 500 to 1,100° C.. Below 500° C., the yield of trichlorosilane produced is low that efficient operation is not attainable. Above 1,100° C., trichlorosilane and tetrachlorosilane are decomposed by hydrogenation and an undesirable silicon forms. An increase in hydrogen pressure does not contribute to a significant improvement in the yield of trichlorosilane produced, so it is not advantageous to perform the reaction under high pressures. However, pressurization enables the use of a compact reactor, so the hydrogen pressure is preferably set within the range of from 1 to 20 atm.

If the contact time is less than 0.01 second, satisfactory conversion to trichlorosilane is not attained. Since the reaction is substantially completed within 20 seconds, it is not advantageous for industrial purposes to employ contact times longer than 20 seconds. A more advantageous contact time is in the range of from 0.1 to 3 seconds, with the range of from 0.2 to 1 second being particularly preferable. For the purpose of improving the yield, it is necessary that the molar ratio of hydrogen to tetrachlorosilane be at least 0.5. If the hydrogen-to-tetrachlorosilane molar ratio exceeds 40, the concentrations of tetrachlorosilane and the product trichlorosilane become too low to achieve a high yield for the reactor. Furthermore, the efficiency of separating hydrogen, tetrachlorosilane, and trichlorosilane, by cooling is undesirably decreased.

According to the present invention, the operation of dechlorinating tetrachlorosilane to form trichlorosilane can be performed industrially over an extended period without any trouble. The concept of the present invention is also applicable to dechlorination of other halides such as titanium chloride, niobium chloride, vanadium chloride, and zirconium chloride.

The following examples and comparative examples are provided for the purpose of further clarifying the concept of the present invention but are in no sense to be taken as limiting.

In the examples and comparative examples, surface area measurements were conducted by the $N_2$-based BET method with a Rapid Surface Area Measurement Apparatus Model SA-100 of Sibata Scientific Technology, Ltd. The surface areas of the catalyst carriers used in Examples 1 to 5 and 7 to 21 were below the limit of measurement by Model SA-100, i.e., $\leq 0.2$ m$^2$/g.

EXAMPLE 1

Crushed particles of fused silica having the composition shown in Table 1 were classified to have a JIS mesh size of from 4.76 to 9.52 mm. Palladium chloride was dissolved in water with heating under acidic conditions (HCl) to make a liquid impregnant, i.e., an aqueous solution having a palladium chloride concentration of 100 g/l. This solution was impregnated in the classified silica carrier particles and excess impregnant not retained on the silica surface was removed by decantation. Thereafter, the palladium chloride on silica carrier was dried and reduced by passage of hydrogen at room temperature. Analysis showed that the amount of palladium which is supported on the carrier is 0.31 wt. % based on the resulting catalyst.

Catalyst A thus-prepared by the above-described method was packed in a quartz reaction tube to fabricate an experimental fixed-bed flow system reactor. A gaseous mixture of tetrachlorosilane and hydrogen ($\frac{1}{3}$ molar ratio) was passed through the reactor at a reaction temperature of 800° C. for a contact time of 0.3 seconds, with the reaction gases being analyzed by on-line gas chromatography. Gas analysis in the initial period of the reaction were 23.0 vol% tetrachlorosilane, 2.0 vol% trichlorosilane, and 2.0 vol% hydrogen chloride (unless otherwise noted, all percentages indicating chromatography analysis are by volume), with the conversion of tetrachlorosilane to trichlorosilane being 8%. With the passage of time, the yield of trichlorosilane increased gradually and analyses after 100 hours were 21.87% tetrachlorosilane, 3.13% trichlorosilane and 3.13% hydrogen chloride, with conversion to trichlorosilane being 12.5%. The conversion to trichlorosilane remained almost constant for the subsequent period and a 4,000 hours long continuous life test on the catalyst showed that its activity was kept constant without any decrease. The spent catalyst was discharged from the reactor and subjected to measurement for its strength, which was found to be substantially the same as the initial strength.

TABLE 1

| Composition of fused silica | |
| --- | --- |
| $SiO_2$ | 99.89% |
| $Al_2O_3$ | 0.026% |
| $Fe_2O_3$ | 0.002% |

EXAMPLE 2

Crushed particles of fused silica having the composition shown in Table 1 were classified to have a JIS mesh size of 4.76–9.52 mm. One part by weight of the classified particles were etched by immersion in 2 parts by weight of an aqueous solution of 50% hydrofluoric acid for 4 hours. As a result of etching, the weight of the silica particles decreased by 23%. The etched silica carrier was washed with a large volume of water and subsequently dried. Palladium chloride was dissolved in water with heating under acidic conditions (HCl) to make a liquid impregnant, i.e., an aqueous solution having a palladium chloride concentration of 100 g/l. This solution was impregnated in the silica carrier and excess impregnant not retained on the silica surface was removed by decantation. Thereafter, the palladium chloride on silica carrier was dried and reduced by passage of hydrogen at room temperature. Analysis showed that the amount of palladium which is supported on the carrier is 0.42 wt. % based on the resulting catalyst.

Catalyst B thus-prepared by the above-described method was packed in a quartz reaction tube to fabricate an experimental fixed-bed flow system reactor. A gaseous mixture of tetrachlorosilane and hydrogen ($\frac{1}{3}$ molar ratio) was passed through the reactor at a reaction temperature of 800° C. for a contact time of 0.45 seconds, with the reaction gases being analyzed by on-line gas chromatography. Gas analysis in the initial period of the reaction were 22.5% tetrachlorosilane, 2.5% trichlorosilane and 2.5% hydrogen chloride, with the conversion of tetrachlorosilane to trichlorosilane being 10%. With the passage of time, the yield of trichlorosilane increased gradually and analyses after 100 hours were 21.2% tetrachlorosilane, 3.8% trichlorosilane and 3.8% hydrogen chloride, with conversion to trichlorosilane being 15%. The conversion to trichlorosilane remained almost constant for the subsequent period and a 4,000 hours long continuous life test on the catalyst showed that its activity was kept constant without experiencing any decrease. The spent catalyst was discharged from the reactor and subjected to measurement for its strength, which was found to be substantially the same as the initial strength.

In a separate experiment, 100 g of the above silica carrier was impregnated with 120 cc of an impregnant containing 100 g palladium chloride per liter and the carrier was immediately dried up by heating to make a catalyst supporting 6% palladium. This catalyst was subjected to a dechlorination test under the same conditions as described above. The conversion of tetrachlorosilane to trichlorosilane was 15% but when the spent catalyst was discharged after 5 hours of the reaction, 90% of the palladium supported on the silica carrier was found to have separated from the carrier. Therefore, the supported amount of the catalytic metal is preferably small so as not to separate from the carrier.

EXAMPLE 3

A dechlorination test was conducted using Catalyst B. The reaction conditions were the same as those employed in Example 2, except that before starting the reaction, a gaseous mixture of trichlorosilane and hydrogen was passed through the reactor at 700° C. so as to convert the supported palladium to palladium silicide. The conversion of tetrachloro-silane to trichlorosilane in the initial period of reaction was 15%, and the catalyst maintained a constant activity for a period of 4,000 hours. Analysis of the spent catalyst by X-ray diffraction produced a peak corresponding to palladium silicide having a crystalline $Pd_2Si$ structure.

EXAMPLE 4

Crushed particles (diameter: 4.76 to 9.52 mm) of fused silica were ground with carborundum being blown under an air stream so as to prepare a silica carrier. In the next step, an acidic (HCl) aqueous solution containing 65 g of palladium chloride per liter was prepared as a liquid impregnant. This aqueous solution was impregnated in the silica carrier and excess impregnant not retained on the silica surface was removed by decantation. Thereafter, the palladium chloride on silica carrier was dried and reduced by passage of hydrogen at room temperature. Analysis showed that the amount of palladium which is supported on the carrier is 0.33 wt. % based on the resulting catalyst.

Catalyst C thus-prepared by the above-described method was subjected to a dechlorination test with the same equipment as used in Example 2. A gaseous mixture of tetrachlorosilane and hydrogen (1/5 molar ratio) was passed through the reactor at a reaction temperature of 700° C. for a contact time of 0.2 seconds. Analysis of the reaction gases after the catalytic activity had reached a steady state showed 14.7% tetrachlorosilane, 2.3% trichlorosilane, and 2.3% hydrogen chloride, with conversion to trichlorosilane being 13.8%. The catalyst could be used continuously for 4,000 hours without experiencing any decrease in the catalytic activity.

EXAMPLE 5

Crushed particles (diameter: 4.76 to 9.52 mm) of fused silica were surface-treated by continuous passage of a gaseous mixture of tetrachlorosilane and hydrogen at 800° C. for 300 hours. The resulting silica carrier was impregnated with an acidic (HCl) aqueous solution containing palladium chloride at a concentration of 100 g/l. Excess solution not retained on the silica surface was removed and the palladium chloride on silica carrier was dried and reduced by passage of hydrogen at room temperature. The thus-prepared catalyst D had 1.0 wt. % palladium supported on the silica carrier. This catalyst was subjected to a deshlorination test with the same equipment as used in Example 2. A gaseous mixture of tetrachlorosilane and hydrogen (1/7 molar ratio was passed through the reactor at a reaction temperature of 600° C. for a contact time of 0.5 seconds. Analysis of the reaction gases after the catalyst activity had reached a steady state showed 11.1% tetrachlorosilane, 1.4% trichlorosilane and 1.4% HCl, with conversion to trichlorosilane being 11.2%. The catalyst could be used continuously for 4,000 hours without experiencing any decrease in the activity.

EXAMPLE 6

A silica gel having the properties shown in Table 2 was heated at 950° C. for 3 hours to form a crystalline silica gel having the properties shown in Table 3. Analysis by X-ray diffraction showed that as a result of this heat treatment, the amorphous silica had turned into a mixture of cristobalite and tridymite. Catalyst E was prepared by supporting 1 wt. % palladium on this crystalline silica gel and subjected to a test for dechorinating tetrachlorosilane with the same equipment as used in Example 2. When the $H_2$/tetrachlorosilane molar ratio was 7.0, with the reaction temperature and contact time being 800° C. and 0.5 seconds, respectively, 20% conversion to trichlorosilane from tetrachlorosilane was attained. The test could be performed continuously for 1,000 hours without experiencing any decrease in catalytic activity.

TABLE 2

| Surface area | 223 m$^2$/g |
| --- | --- |
| Pore volume | 1.062 cc/g |
| Volume distribution | |
| <100 Å | 0.056 cc/g |
| 100 ≦ d < 200 Å | 0.956 cc/g |
| 200 ≦ d < 400 Å | 0.037 cc/g |
| ≧400 Å | 0.013 cc/g |
| Average pore size | 190 Å |

TABLE 3

| Surface area | 0.3 m$^2$/g |
| --- | --- |
| Void volume | 0.056 cc/g |

EXAMPLE 7

Catalyst F was prepared by supporting 0.4 wt. % ruthenium on a silica carrier which had been treated with hydrofluoric acid as in Example 2. A dechlorination test was conducted on this catalyst under the same reaction conditions as in Example 2. The conversion to trichlorosilane from tetrachlorosilane was 10% and the test could be performed continuously for 1,000 hours without experiencing any decrease in catalytic activity.

EXAMPLE 8

Catalyst G was prepared by supporting 0.4 wt. % platinum on a silica carrier which had been treated with hydrofluoric acid as in Example 2. A dechlorination test was conducted on this catalyst under the same reaction conditions as in Example 2. The conversion to trichlorosilane from tetrachlorosilane was 4% and the test could be performed continuously for 1,000 hours without experiencing any decrease in catalytic activity.

EXAMPLE 9

A gaseous mixture of niobium pentachloride and hydrogen (1/1 molar ratio) was passed through a reactor packed with a catalyst that was the same as Catalyst B prepared in Example 2. The reaction temperature was 350° C. and the contact time was 0.5 seconds. The conversion to niobium tetrachloride from niobium pentachloride was 34.1% and the test could be performed continuously for 1,000 hours without experiencing any decrease in catalytic activity.

EXAMPLE 10

A gaseous mixture of vanadium tribromide and hydrogen (⅓ molar ratio) was passed through a reactor packed with Catalyst B prepared in Example 2. The reaction temperature was 500° C. and the contact time was 0.4 seconds. The conversion to vanadium dibromide from vanadium tribromide was 18% and the test could be performed continuously for 1,000 hours without experiencing any decrease in catalytic activity.

EXAMPLE 11

Crushed particles (diameter: 4.76 to 9.52 mm) of fused silica were impregnated with an aqueous solution containing a 1/1 mixture of 100 g/l of palladium chloride and 100 g/l of ruthenium chloride. Excess impregnant not retained on the silica carrier were removed, and dried and reduced with hydrogen to make Catalyst H in which 0.3 wt. % of palladium and 0.3 wt. % of ruthenium were supported on the silica carrier. A gaseous mixture of tetrachlorosilane and hydrogen (1/5 molar ratio) was passed through a reactor packed with catalyst H at a reaction temperature of 750° C. for a contact time of 0.25 seconds. Analysis of the reaction gases after the catalyst activity had reached a steady state showed 14.1% tetrachlorosilane, 2.6% trichlorosilane and 2.6% hydrogen chloride, with conversion to trichlorosilane being 15.6%. The test was conducted for 1,000 continuous hours but no decrease in catalytic activity had occurred.

EXAMPLE 12

Palladium chloride was dissolved in water heating under acidic conditions (HCl) so as to prepare a liquid impregnant in the form an aqueous solution of palladium chloride. This solution was impregnated in silicon carbide (SiC) particles with a size of 4 mm that had the properties and composition shown in Table 4. Excess solution not retained on the carrier surface was removed by decantation, and thereafter, the palladium chloride on SiC carrier was dried and reduced by passage of hydrogen at room temperature. Analysis showed that palladium which is supported on the carrier is 1 wt. % based on the resulting catalyst.

Catalyst I thus-prepared by the above-described method was packed in a quartz reaction tube to fabricate an experimental fixed-bed flow system reactor. A gaseous mixture of tetrachlorosilane and hydrogen (⅓ molar ratio) was passed through the reactor at a reaction temperature of 800° C. for a contact time of 0.21 seconds, with the reaction gases being analyzed by on-line gas chromatography. Gas analyses in the initial period of the reaction were 23.5% tetrachlorosilane, 1.4% trichlorosilane and 1.5% hydrogen chloride, with the conversion of tetrachlorosilane to trichlorosilane being 5.6%. With the passage of time, the yield of trichlorosilane increased gradually and analyses after 100 hours were 21.5% tetrachlorosilane, 3.5% trichlorosilane and 3.5% hydrogen chloride, with conversion to trichlorosilane being 14.0%. The conversion to trichlorosilane remained almost constant for the subsequent period and a 4,000 hours long continuous life test on the catalyst showed that its activity was kept constant without any decrease.

TABLE 4

| Properties and composition of SiC | | | |
| --- | --- | --- | --- |
| Properties | | Composition (%) | |
| Porosity | 34% | SiC | 98.4 over |
| Water absorption | 16% | Al$_2$O$_3$ | 0.11 |
| Bulk specific gravity | 2.1 | SiO$_2$ | 0.36 |
| Packing specific gravity | 1.15 g/cc | Fe$_2$O$_3$ | 0.2 |
| Average pore diameter | 5 ot 35 μm | | |

EXAMPLE 13

A dechlorination test was conducted using Catalyst I prepared in Example 12. The reaction conditions were identical to those employed in Example 12, except that before starting the reaction, a gaseous mixture of trichlorosilane and hydrogen was passed through the reactor at 700° C. so as to convert the supported palladium to palladium silicide. The conversion of tetrachlorosilane to trichlorosilane in the initial period of reaction was 14.0% and the catalyst maintained a constant activity for a period of 4,000 hours. Analysis of the spent catalyst by X-ray diffraction produced a peak corresponding to palladium silicide having a crystalline Pd$_2$Si structure.

EXAMPLE 14

An acidic (HCl) aqueous solution of palladium chloride was prepared as a liquid impregnant. Crushed particles (diameter: ca. 3 to 6 mm) of silicon nitride (Si$_3$N$_4$) having the properties and composition shown in Table 5 were impregnated with the impregnant and excess impregnant not retained on the carrier surface was removed by decantation. Thereafter, the palladium chloride on the carrier was dried and reduced by passage of hydrogen at room temperature. Analysis showed that the amount of palladium which is supported on the carrier is 1.1 wt. % based on the resulting catalyst.

Catalyst J thus-prepared by the above-described method was subjected to a dechlorination test with the same equipment as used in Example 12. A gaseous mixture of tetrachlorosilane and hydrogen (1/5 molar ratio) was passed through the reactor at a reaction temperature of 700° C. for a contact time of 0.15 seconds. Analysis of the reaction gases after the catalytic activity had reached a steady state showed 14.4% tetrachlorosilane, 2.2% trichlorosilane and 2.2% hydrogen chloride, with conversion to trichlorosilane being 13.3%. The catalyst could be used continuously for 4,000 hours without any decrease in the catalytic activity.

TABLE 5

| Properties and composition of Si$_3$N$_4$ | | | |
|---|---|---|---|
| Properties | | Composition | |
| Porosity | 17% | Si$_3$N$_4$ | 98% over |
| Bulk specific gravity | 3.00 | | |
| Packing specific gravity | 2.44 g/cc | | |

EXAMPLE 15

A liquid impregnant in the form of an acidic (HCl) solution of palladium chloride was impregnated in a boron nitride (BN) carrier having a particle size of about 6 mm and a bulk specific gravity of 2.11. Excess impregnant not retained on the carrier surface was removed and the palladium chloride on the carrier was dried and reduced by passage of hydrogen at room temperature so as to prepare Catalyst K carrying 0.5 wt. % palladium. This catalyst was subjected to a dechlorination test with the same equipment as used in Example 12. A gaseous mixture of tetrachlorosilane and hydrogen (1/7 molar ratio) was passed through the reactor at a reaction temperature of 720° C. for a contact time of 0.4 seconds. Analysis of the reaction gases after the catalyst activity had reached a steady state showed 10.4% tetrachlorosilane, 2.1% trichlorosilane, and 2.1% hydrogen chloride, with conversion to trichlorosilane being 16.8%. The catalyst could be used continuously for 1,000 hours without any decrease in the activity.

EXAMPLE 16

A liquid impregnant in the form of an acidic (HCl) solution of palladium chloride was impregnated in a graphite carrier of crushed particles (diameter: ca. 3 to 6 mm) having a bulk specific gravity of 1 77. Excess impregnant not retained on the carrier surface was removed and the palladium chloride on the carrier was dried and reduced by passage of hydrogen at room temperature so as to prepare Catalyst L carrying 0.7 wt. % palladium. This catalyst was subjected to a dechlorination test with the same equipment as used in Example 12. A gaseous mixture of tetrachlorosilane and hydrogen (1/7 molar ratio) was passed through the reactor at a reaction temperature of 790° C. for a contact time of 0.15 seconds. The conversion to trichlorosilane from tetrachlorosilane was 19.6%, and the test could be performed for 1,000 continuous hours without any decrease in catalytic activity.

EXAMPLE 17

Catalyst M supporting 0.4 wt. % ruthenium on a silicon carbide carrier was prepared in the same manner as in Example 12. A dechlorination test was conducted on this catalyst under the same reaction conditions as in Example 12. The conversion to trichlorosilane from tetrachlorosilane was 9.4% and the test could be performed continuously for 1,000 hours without any decrease in catalytic activity.

EXAMPLE 18

Catalyst N supporting 0.4 wt. % platinum on a silicon carbide carrier was prepared in the same manner as in Example 12. A dechlorination test was conducted on this catalyst under the same reaction conditions as in Example 12. The conversion to trichlorosilane from tetrachlorosilane was 3.4% and the test could be performed continuously for 1,000 hours without any decrease in catalytic activity.

EXAMPLE 19

A gaseous mixture of niobium pentachloride and hydrogen (1/1 molar ratio) was passed through a reactor packed with Catalyst K prepared in Example 15. The reaction temperature was 350° C. and the contact time was 0.4 seconds. The conversion to niobium tetrachloride from niobium pentachloride was 36.2% and the test could be performed continuously for 1,000 hours without any decrease in catalytic activity.

EXAMPLE 20

A gaseous mixture of vanadium tribromide and hydrogen (⅔ molar ratio) was passed through a reactor packed with Catalyst K prepared in Example 15. The reaction temperature was 500° C. and the contact time was 0.3 seconds. The conversion to vanadium dibromide from vanadium tribromide was 16.2% and the test could be performed continuously for 1,000 hours without any decrease in catalytic activity.

EXAMPLE 21

A silicon nitride carrier in the form of crushed particles (diameter: ca. 4 to 8 mm) was impregnated with an aqueous solution containing a 1/1 mixture of palladium chloride and ruthenium chloride. Excess impregnant not retained on the carrier was removed and the catalytic components on the carrier were dried and reduced with hydrogen to make Catalyst P carrying 0.3 wt. % palladium and 0.3 wt. % ruthenium. A gaseous mixture of tetrachlorosilane and hydrogen (1/5 molar ratio) was passed through a reactor packed with Catalyst P at a reaction temperature of 750° C. for a contact time of 0.22 seconds. Analysis of the reaction gases after the catalytic activity had reached a state showed 14.1% tetrachlorosilane, 2.5% trichlorosilane and 2.5% hydrogen chloride, with conversion to trichlorosilane being 15.1%. The test was conducted for 1,000 continuous hours but catalytic activity did not decrease.

The advantages of the present invention will become more apparent by the following comparative examples.

COMPARATIVE EXAMPLE 1

Catalyst Q having 1 wt. % palladium on silica brick was prepared by impregnating an aqueous solution of 50 g/l of palladium chloride in crushed particles (diameter: 4.76 to 9.52 mm) of silica brick having the properties and composition shown in Table 6. The catalyst was subjected to a dechlorination test under the same reaction conditions as in Example 2. In the initial period of reaction, the conversion to trichlorosilane from tetrachlorosilane was 15% but as the reaction proceeded, it gradually decreased and after 50 hours, it was 13% which further fell to 12% after 100 hours. After the lapse of 100 hours, the catalyst had completely lost its strength and crumbled when it was discharged from the reactor.

TABLE 6

| Composition and properties of quartz brick | | | |
|---|---|---|---|
| Composition (wt %) | | Properties | |
| $SiO_2$ | 99.8 over | surface area | 6.15 $m^2/g$ |
| $Al_2O_3$ | 0.04 | void volume | 0.102 cc/g |
| $Fe_2O_3$ | 0.01 | | |

COMPARATIVE EXAMPLE 2

Catalyst R was prepared by supporting 1 wt. % palladium on a silica gel having the properties shown in Table 7. The catalyst was subjected to a dechlorination test under the same reaction conditions as employed in Example 1. In the initial period of reaction, the conversion to trichlorosilane from tetrachlorosilane was 5% but it gradually decreased as the reaction proceeded: after 30 h, 6.5% after 50 h, and 4% after 100 h. After the lapse of 100 hours, the catalyst was discharged from the reactor and was found to have been almost disintegrated into loose particles, with 93.8 wt. % of the initial weight of the catalyst lost.

TABLE 7

| Shape | sphere particles (diameter 3 mmØ) |
|---|---|
| surface area | 223 $m^2/g$ |
| void volume | 1.062 cc/g |

The catalyst of the present invention has a very long life and exhibits a high activity. The corrosion-resistant ceramic or graphite used as the carrier is highly resistant to corrosion but it has not been known in the prior art that these materials also exhibit high corrosion resistance in a dehalogenating reaction that is carried out at elevated temperatures in a highly corrosive atmosphere in which both hydrogen chloride and hydrogen exist.

Highly corrosion-resistant materials usually have low surface activity and have never been used as catalyst carriers because of the alleged reason that their ability to support catalytic components is too small to provide enhanced catalytic activities Notwithstanding this fact, the catalyst of the present invention in which a platinum group metal or a silicide thereof is supported on the corrosion-resistant ceramic or graphite is long-lived and exhibits a satisfactorily high activity, thereby attaining a high conversion rate over a prolonged period.

A further advantage of the catalyst of the present invention is that it is not consumed during the reaction which is carried out in its presence, so that the reaction can be continued for an extended period. In addition, the reaction can be accomplished with high efficiency by selecting appropriate reaction conditions.

While the invention has been described in detail and with reference to specific examples thereof, it will be apparent to one skilled in the art that various changes and modifications can be made therein without departing from the spirit and scope thereof.

What is claimed is:

1. A catalyst for dehalogenation of a halide comprising a corrosion-resistant ceramic or graphite having a surface area of 5.0 $m^2/g$ or less and, supported thereon, at least one member selected from the group consisting of a platinum group metal and a silicide thereof.

2. A catalyst according to claim 1 wherein said corrosion-resistant ceramic is a nonporous silica, a nitride or a carbide.

3. A catalyst according to claim 2 wherein said nonporous silica is an amorphous silica in the form of a glassy solid fused silica.

4. A catalyst according to claim 2 wherein said nonporous silica is an amorphous silica obtained by etching the surface of a glassy solid fused silica with hydrofluoric acid.

5. A catalyst according to claim 2 wherein said nonporous silica is an amorphous silica obtained by grinding and polishing the surface of a glassy solid fused silica with an abrasive.

6. A catalyst according to claim 2 wherein said nonporous silica is an amorphous silica obtained by treating the surface of a glassy solid fused silica through contact with at least one of hydrogen and a chlorosilane at a high temperature.

7. A catalyst according to claim 2 wherein said nonporous silica is a crystalline silica obtained by crystallizing a silica gel with a surface area of from 150 to 300 $m^2/g$.

8. A catalyst according to claim 2 wherein said nitride is silicon nitride or boron nitride.

9. A catalyst according to claim 2 wherein said carbide is silicon carbide.

10. A catalyst according to claim 1 wherein said platinum group metal and a silicide thereof are palladium and palladium silicide.

* * * * *